June 9, 1953   G. OULIANOFF ET AL   2,641,422
EXHAUST SYSTEM FOR GAS TURBINE ENGINES IN AIRCRAFT
Filed March 8, 1949   3 Sheets-Sheet 1
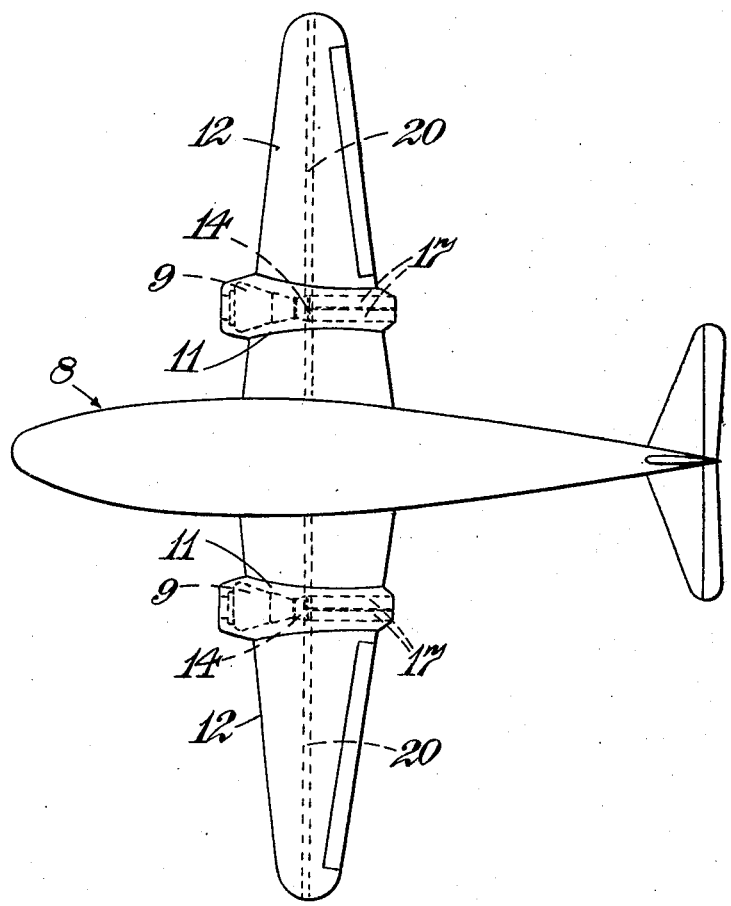
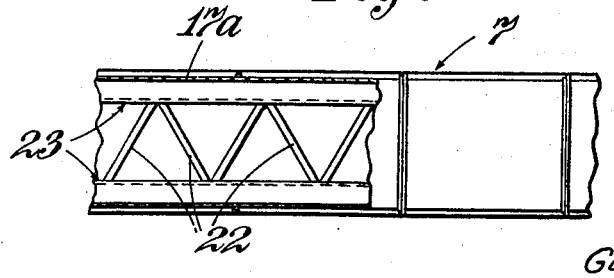
INVENTORS
GEORGE OULIANOFF
& C. A. DAVIS
by Wilkinson Mawhinney
Attorneys

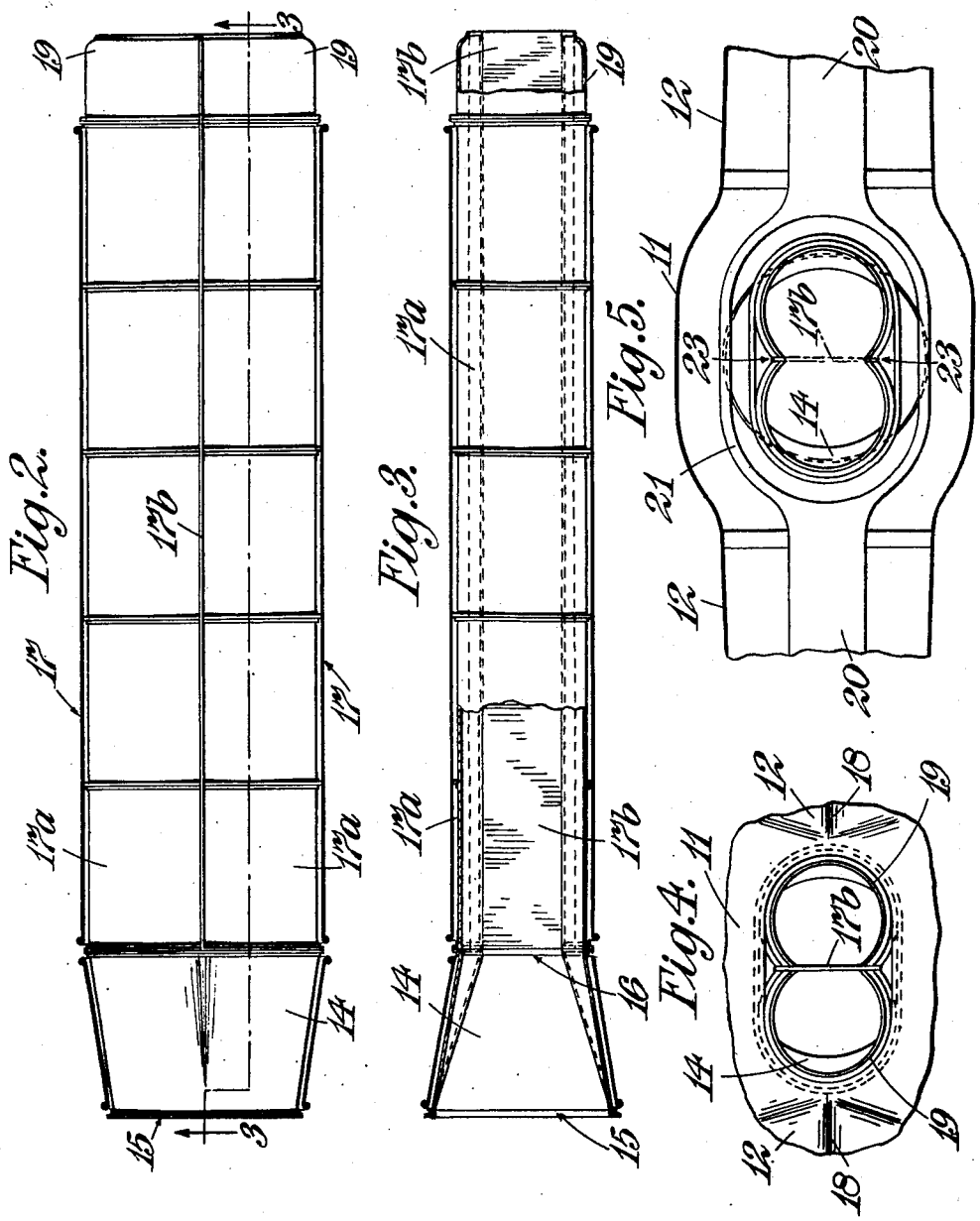

June 9, 1953 G. OULIANOFF ET AL 2,641,422
EXHAUST SYSTEM FOR GAS TURBINE ENGINES IN AIRCRAFT
Filed March 8, 1949 3 Sheets-Sheet 3
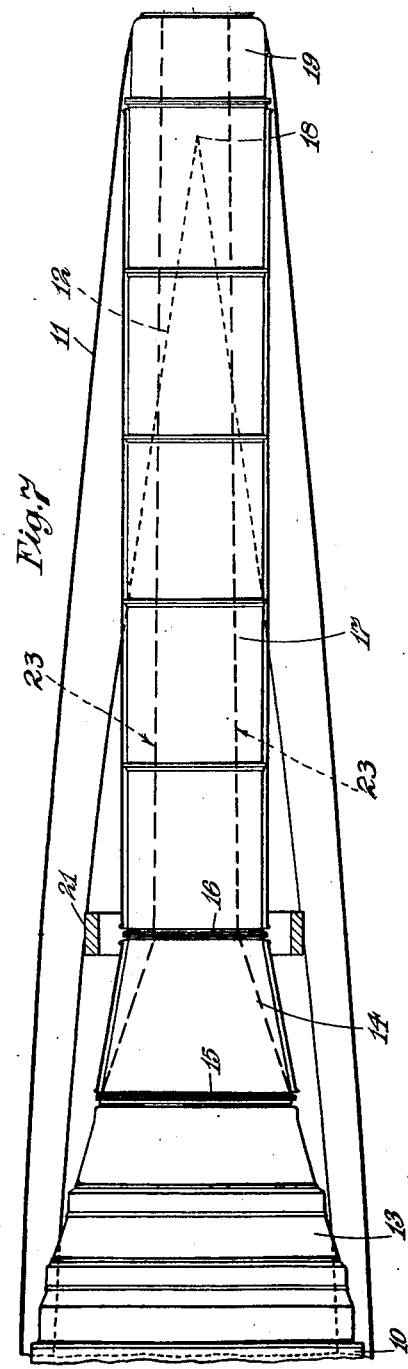
INVENTORS
GEORGE OULIANOFF &
C. A. DAVIS Patented June 9, 1953

2,641,422

UNITED STATES PATENT OFFICE 2,641,422

EXHAUST SYSTEM FOR GAS TURBINE ENGINES IN AIRCRAFT

George Oulianoff, Allestree, Derby, and Christopher Ainsworth Davis, Barrow-on-Soar, near Loughborough, England, assignors to Rolls-Royce Limited, Derby, England, a British company Application March 8, 1949, Serial No. 80,124
In Great Britain February 18, 1947

4 Claims. (Cl. 244—15)

This invention relates to exhaust assemblies for aircraft gas-turbine-engines. Such an engine normally comprises a compressor system, combustion equipment and a turbine system, the exhaust gases from which are directed rearwardly with respect to the direction of flight of the aircraft for propulsion purposes; such reaction propulsion may constitute sole propulsion means for the aircraft or may be used in conjunction with an airscrew or ducted fan driven by the turbine system.

The present invention is concerned with problems arising in the installation of gas-turbine-engines in aircraft and has for an object to provide an improved exhaust assembly which facilitates installation in an aircraft and enables the structural design of the aircraft to be simplified.

A further object of the invention is to reduce the overall drag involved in the installation of the engine in the aircraft.

According to the present invention, in an aircraft wing structure having a main spar, a gas-turbine engine mounted in the wing structure forwardly of said main spar and an exhaust assembly for the engine, there is provided an exhaust assembly construction having a part which extends from forwards of the main spar to rearwards of the main spar, said part being formed by a plurality of exhaust pipe members having their axes in a common plane extending substantially parallel to the direction of normal flight, the exhaust pipe members having part-cylindrical wall portions joining adjacent part-cylindrical wall portions in cusp formations and there being means interconnecting the cusp formations between a pair of exhaust pipe members, and a duct section located forwardly of the main spar and said exhaust pipe members, said duct section having a single inlet connected to receive the exhaust gases from the engine and a plurality of outlets one connected to deliver exhaust gas to each of said exhaust pipe members. The means joining the cusp formations may be a plane separating wall or a series of stays. A reduction of the minimum dimension of the exhaust system is thus obtained whilst by retaining substantially circular-sectioned ducts the weight of the ducts is kept low.

Further, in partly under-slung gas-turbine-engine wing-installations, the exhaust assembly of this invention is advantageous in that local bowing of a main spar to provide clearance for the exhaust assembly passing below it is unnecessary and at the same time excessive lowering of the engine is avoided.

In other aircraft constructions, the exhaust assembly may be accommodated readily between upper and lower main spars without the latter being shaped to clear the assembly.

As compared with known exhaust systems which have a single circular sectioned exhaust duct or jet-pipe and have a minimum dimension represented by the overall diameter of the duct, an exhaust system of the invention adapted to carry the same through-put of exhaust gases and having two or more substantially circular-sectioned exhaust ducts has a substantially reduced minimum dimension represented by the maximum overall diameter of one of the ducts.

A gas-turbine-engine powered aircraft when fitted with an exhaust assembly arrangement as set forth above, may have a nacelle which in vertical section is of aerofoil or streamline form to accommodate engine and exhaust assembly with the exhaust assembly extending to adjacent the trailing edge of the nacelle. In such an arrangement the shape of the trailing edge of the nacelle may be made more closely to conform to a true streamline section whilst the design of the aircraft structure may be simplified and the installation of the gas-turbine-engine and nacelle structure is facilitated since more space is available in the horizontal plane than in the vertical plane for clearance purposes.

There will now be described by way of example of this invention, some constructions of exhaust assembly suitable for use with a gas-turbine engine installed in an aircraft wing for reaction propulsion purposes. The description refers to the accompanying drawings in which:

Figure 1 is a diagrammatic view of an aircraft fitted with an exhaust assembly of this invention, Figure 2 is a plan view of one construction of exhaust assembly, Figure 3 is a sectional elevation of the exhaust assembly, the section being partly on the line 3—3 of Figure 2, Figure 4 is a view on the outlet end of the exhaust assembly, Figure 5 is a section through the aircraft wing adjacent a main spar, Figure 6 illustrates a second construction, and Figure 7 is a sectional elevation of the exhaust assembly in a wing nacelle.

Referring to the drawings, the engine 9 comprises the turbine 10 and is located in a nacelle 11 in wing 12 of an aircraft 8 (Figure 1). A position for the wing main spar 20 is indicated in Figure 1.

The nacelle 11 of which the rear portion is shown in Figure 4, is in vertical section of substantially aerofoil or streamline form, and will, as is usual, have an air inlet at its forward end.

The turbine 10 has an annular outlet communicating with the primary exhaust unit 13 which is conveniently of known form comprising an outer casing and an inner substantially conical fairing between which there is defined an annular exhaust passage which merges into a cylindrical passage at the apex of the conical fairing.

The secondary exhaust assembly comprises a duct section 14 which is bolted to the unit 13 which, as will be seen from Figures 1 and 2, has a circular-sectioned inlet end 15 to register with the outlet from the exhaust unit 13 and a pair of segmental outlets 16; it being arranged that the effective total area of the outlets 16 is substantially the same as the area of the inlet 15. Intermediate the inlet 15 and outlets 16, the duct section flattens and widens in a manner to ensure that the change of flow of the exhaust gases through it is effected smoothly.

The duct section 14 delivers to a pair of jet pipe members 17 which are built-up from a number of flanged sections 17a which are major parts of cylinders, the jet-pipe members having their axes parallel and having either a plane dividing wall 17b (Figure 3) or a series of stays 22 (Figure 6) joining the cusps 23 formed at the junctions of the part cylindrical section 17a. Thereby the jet-pipe members 17 mate with the segmental outlets 16 beyond the trailing edge 18 of the wing but short of the outlet end of the nacelle. Each jet-pipe 17 is fitted at its outlet end with a nozzle 19, which projects slightly beyond the trailing edge of the nacelle 11.

From the foregoing description, it will be appreciated that the diameter of the portion 17a of the jet-pipes 17 is so chosen that their total effective area is equivalent to the effective area of a single jet-pipe which would, in a conventional construction, be fitted to the outlet from the exhaust unit 13 in place of the parts 14, 17.

It will be appreciated moreover that since the axes of the portions 17a of the jet-pipes 17 lie in a horizontal plane (as viewed in the drawing) the overall vertical dimension is substantially less than the corresponding dimension of a conventional single jet-pipe, although the overall horizontal dimension is somewhat greater than that of the conventional single jet-pipe.

The arrangement of the invention has (as compared with the conventional single jet-pipe arrangement), the advantages that in wing installations (a) The nacelle can conform more closely to a streamline section; (b) The jet-pipes are more readily accommodated in the region of the rear main spar of the wing. For example, where the main spar 20 is of "banjo" form as illustrated at 21, the depth of the "banjo" can be reduced; alternatively, where the engine is under-slung local bowing of the main spar in the region of the engine is unnecessary to permit the exhaust assembly to pass below it and at the same time excessive lowering of the engine is avoided; where the wing is formed with upper and lower rear main spars the exhaust assembly can be accommodated between the spars without their being shaped to clear the assembly. (c) A reduction in the minimum dimension of the exhaust assembly is obtained whilst the weight of the ducts is kept low due to the use of substantially circular-sectioned ducts.

The increased maximum dimension of the assembly does not give rise to any disadvantage in installation since the greater width can be readily accommodated in a wing structure.

The use as far as possible, of part-circular portions 17a throughout the exhaust assembly has the advantage that the weight of the assembly is kept low in respect to the pressure loading to which the ducts are subjected internally.

The invention is not limited to the use of an exhaust assembly having two parallel exhaust ducts, since if desired three or more parallel exhaust ducts may be provided in an exhaust assembly.

In the construction illustrated, each exhaust duct 17 is provided with a separate propelling nozzle 19. It is contemplated that in certain cases a single exit nozzle may be provided, the flow through the ducts 17 being unified by means of a duct section functioning in the reverse manner to the duct section 14. Such an arrangement may be adopted to enable the exhaust duct to avoid structure of the airframe which would prevent the passage of a continuous single exhaust duct.

We claim:

1. In an aircraft wing structure having a main spar; a gas-turbine engine mounted in the wing structure forwardly of said main spar and an exhaust assembly for the engine, a construction of said exhaust assembly having a part which extends from forwards of the main spar to rearwards of the main spar, said part being formed by a plurality of exhaust pipe members having their axes in a common plane extending substantially parallel to the direction of normal flight, the exhaust pipe members having part-cylindrical wall portions joining adjacent part-cylindrical wall portions in cusp formations and there being means interconnecting the cusp formations between a pair of exhaust pipe members, and a duct section located forwardly of the main spar and said exhaust pipe members; said duct section having a single inlet connected to receive the exhaust gases from the engine and a plurality of outlets one connected to deliver exhaust gas to each of said exhaust pipe members.

2. A construction of exhaust assembly as claimed in claim 1, wherein the means joining the cusp formations is a plane separating wall.

3. A construction of exhaust assembly as claimed in claim 1, wherein the means joining the cusp formations comprises a series of stays.

4. In an aircraft wing structure having a main spar, a gas-turbine engine mounted in the wing structure forwardly of said main spar and an exhaust assembly for the engine, a construction of said exhaust assembly having the part which extends from forwards of the main spar to rearwards of the main spar, said part being formed by two exhaust pipe members having their axes parallel and extending substantially in the direction of normal flight, each exhaust pipe member comprising a wall portion which is the major part of a cylinder and joins the other wall portion in cusp formations and means joining the cusp formations, and a duct section located forwardly of the main spar and said exhaust pipe members, said duct section having a single inlet connected to receive the exhaust gases from the engine and two outlets one connected to each of said exhaust pipe members to deliver exhaust gas thereto, said exhaust pipe members having a total effective area substantially equal to the effective area of the inlet to the said duct section.

GEORGE OULIANOFF.
CHRISTOPHER AINSWORTH DAVIS.

References Cited in the file of this patent

UNITED STATES PATENTS

| Number | Name | Date |
| --- | --- | --- |
| 1,708,803 | Schaefer | Apr. 9, 1929 |
| 2,103,466 | Klemm et al. | Dec. 28, 1937 |
| 2,280,835 | Lysholm | Apr. 28, 1942 |
| 2,420,323 | Meyer et al. | May 13, 1947 |
| 2,441,488 | Howell | May 11, 1948 |
| 2,488,174 | Clegern | Nov. 15, 1949 |

FOREIGN PATENTS

| Number | Country | Date |
| --- | --- | --- |
| 403,730 | France | Oct. 2, 1909 |
| 578,837 | Great Britain | July 15, 1946 |
| 580,995 | Great Britain | Sept. 26, 1946 |
| 585,557 | Great Britain | Feb. 11, 1947 |